92-14 SR
9/21/76 OR RE 28,967

United States Patent [19]

Weiss

[11] E Re. 28,967

[45] Reissued Sept. 21, 1976

[54] WORK LOCATING APPARATUS

[75] Inventor: Dieter Weiss, Neckarweihingen, Germany

[73] Assignee: Weiss KG, Neckarweihingen, Germany

[22] Filed: Sept. 25, 1975

[21] Appl. No.: 616,844

Related U.S. Patent Documents

Reissue of:

[64] Patent No.: 3,812,766
Issued: May 28, 1974
Appl. No.: 248,455
Filed: Apr. 28, 1972

[30] Foreign Application Priority Data

Aug. 5, 1971 Germany ..... 2139150

[52] U.S. Cl. ..... 92/14; 92/25; 92/27; 92/29; 92/113

[51] Int. Cl.² ..... F15B 15/22

[58] Field of Search ..... 92/14, 16, 25, 29, 65, 92/27, 113

[56] References Cited

UNITED STATES PATENTS

| | | | |
|---|---|---|---|
| 1,965,106 | 7/1934 | McDougall | 92/29 |
| 3,135,171 | 6/1964 | Michalak, Jr. | 92/29 |
| 3,160,078 | 12/1964 | Hiemstra et al. | 92/14 |
| 3,320,861 | 5/1967 | Johnson et al. | 92/14 |

*Primary Examiner*—Martin P. Schwadron
*Assistant Examiner*—Abraham Hershkovitz
*Attorney, Agent, or Firm*—Holman & Stern

[57] ABSTRACT

A work locating apparatus having a tension member actuated by an actuating member, particularly an actuating piston, via a starting stroke and a working stroke in which a pneumatic cylinder constitutes a control means and a mechanical step-up mechanism is operable between the control means and the tension member with the actuating member abutting directly the tension member by the starting stroke and the step-up mechanism by the working stroke of the tension member.

22 Claims, 6 Drawing Figures

WORK LOCATING APPARATUS

Matter enclosed in heavy brackets [ ] appears in the original patent but forms no part of this reissue specification; matter printed in italics indicates the additions made by reissue.

BACKGROUND OF THE INVENTION

The present invention relates to a work locating apparatus having a tension member which is actuated by means of an activating device, especially an actuating piston via a starting stroke and a working stroke, which actuating means is formed especially by a pneumatic cylinder, and the direction of the actuating means being movably adjustable.

PRIOR ART

In prior art devices of this type, the tension member is in immediate connection with the actuating piston of the pneumatic cylinder and it is for this reason that the entire tension forces must be provided by the pneumatic cylinder-piston unit.

The instant invention has as its object the removal of such disadvantages and consists in general in a device in which the actuating member actuates the tension member by means of the starting stroke directly, and actuates a mechanical step-up mechanism by means of the working stroke of the tension member, with the step-up mechanism functioning between a control means and the tension member. During the starting stroke, the tension device is unstressed and the tension member and may now be moved by means of the starting stroke without the need for a substantial use of forces. Due to the fact that the comparatively short working stroke, which requires a large force, is effected via a mechanical step-up mechanism, and because the step-up mechanism is supported against the cylinder, with the power course being thus made to the tension member via the cylinder and step-up mechanism, while the actuating piston of the pneumatic cylinder-piston unit actuates the step-up mechanism, a substantial power saving is obtained. If there is a need for utilizing the entire tension strength of the piston of the unit, there is then a need for subjecting the cylinder to a high pressure, while such a pressure is unavailable in most of the workshops. As the step-up mechanism is not supported against the piston but rather immediately against the cylinder, and the piston effects only the actuation of the step-up mechanism, very large tensional forces can be provided with a low pressure in the cylinder.

SUMMARY OF THE INVENTION

According to the instant invention, the arrangement is preferably such that the step-up mechanism is provided with a sensor or feeler which is mounted suitably on the inside wall of the cylinder which forms the control, with the feeler disconnecting the actuating member from the tension member independently of the design of the control at the end of the working stroke, and moving the step-up mechanism into the working position. The step-up mechanism is switched on and started by means of the feeler according to a pre-set course, i.e. at the end of the starting stroke. It is advantageous that the step-up mechanism be constructed to be self-locking. Since the pressure in the cylinder during the working stroke serves only for the actuation of the step-up mechanism, the tension force of the device may be retained also when the working area of the actuating cylinder becomes depressurized.

According to a preferred embodiment of the instant invention, the step-up mechanism is provided with a power-transmission member which is supported on a support area in the working position at the control and at the tension member, that is, on one of these parts, whereby the support area is positioned at a right angle to the stroke-direction. This power transmission member now functions similarly to a wedge between the cylinder and the tension member which, in this way, is thus moved forward with great force. The arrangement is effected in such a way that the tension member is in a disconnectable connection with the starting member, with a swingable lever being pivotally arranged on the tension member, and constituting simultaneously the sensor and the power transmission members, and the starting member being provided with a wedge area which is inwardly inclined in a direction opposite to the stroke direction, whereby the wedge-area, during the working stroke, presses the power transmission member against the support area of the control which is positioned transversely to the stroke direction.

In a preferred embodiment of the instant invention, the starting member consists of an annular piston which encircles a central piston connected with the tension member, and the annular piston has a collet or sleeve which encircles the central piston, with the collet being provided with the wedge-area. The central piston is formed with a clearance into which is secured a control section of the lever, located at a distance from the rocking axis, with the control section being secured by the part of the lever which abuts or engages the cylinder wall and which constitutes the sensor or feeler, with the front edge of the collet engaging the control section during the starting stroke, and the cylinder being provided with a recessed area, which is delineated axially on that side which is closest to the actuating piston by means of the support area positioned transversely to the stroke-direction, and in which that part of the lever constituting the sensor, drops as the end of the actuating stroke, whereby the control section of the lever is moved to the inclined area of the collet. It is advantageous that the recessed area of the cylinder be constructed as a circular area and the clearance of the central piston be defined by an annular groove, with a plurality of swinging levers being evenly positioned about the circumference of the central piston on the tension member. Thus, the levers, together with the tension member, are moved by means of the annular piston over the collet, during the starting stroke, whereby the levers, by their resting onto the front edge of the collet, carry with them the tension member. After completion of the starting stroke, the part of the lever which constitutes the sensor, can enter the circular area of the cylinder, so that the level releases the central piston and the control section of the lever runs freely onto the wedge- or inclined area of the collet periphery, whereby the lever, during the further stroke of the annular piston, which constitutes the starter piston, is continuously forced deeper into the annular groove of the central piston, and moves the tension member forward with great force. The central piston, which is advantageously connected with the tension member, remains thereby in place, since the tension member only completes a very small working course. If the support area, against which the sensor of the lever is pressed or forced, is positioned vertically to the stroke direction, then a comparatively small working stroke is obtained through the swinging of the lever. The arrangement is, however, advantageous in that the support area is inclined outwardly at a pointed angle to the stroke direction in the direction of the axis of the cylinder which forms the control means and inclined inwardly towards the starting piston, and is preferably constructed as a conical area, whereby the working course is increased.

In order to guarantee the self-locking, the collet may, in a preferred embodiment of the instant invention, be of a design in which outwardly inclined and/or cylindrical sections alternate with inwardly inclined sections whereby a cylindrical section or an inwardly inclined section is arranged at the starter piston end and an outwardly inclined section at the free end. When the control section of the lever is located on the cylindrical sections, then there is obtained a sufficient guarantee against an unintentional loosening. If, however, the control section is located on an outwardly inclined section during a pressure-decrease, it is then able to push the collet back over this section, and in such case, an inwardly inclined section is more advantageous to prevent the further displacing of the collet. For this case, it is necessary to provide for a pressure means, which transmits the tensional force, which is supported against the tension member under interpolation of a spring, which is being compressed at the end of the working stroke. In a case in which, during a pressure loss, the control means of the lever is at that moment touching an outwardly inclined section of the collet and the starter piston moves together with the collet until the control member reaches an inwardly inclined or cylindrical section, this stroke of the tension member is then accepted by the spring without a substantial decrease of the tension strength.

Due to the self-locking construction of the mechanical step-up mechanism, the tension device also remains in the tension position after a pressure release from the working area of the starting piston is effected. It is therefore necessary that in this situation a special arrangement be provided for releasing the tension member. This may be accomplished in that the tension member is cylindrical in shape and is guided in a collar of the cylinder which forms the control, with the circular area being provided with a pressure-connection means. Through a pressurizing of the circular area, the starting piston is thereby engaging in the counter direction. The annular piston is moved back and the collet releases the control member of the levers, whereby the work locating apparatus is again moved back to its original position.

The instant invention thus enables the utilization of air-pressure pipes available in each workshop, which supplies only comparatively low pressures, for using high tension forces.

BRIEF DESCRIPTION OF THE DRAWINGS

The instant invention is schematically illustrated in the drawings by exemplary embodiments, in which.

DETAILED DESCRIPTION OF THE INVENTION

Figure 1:
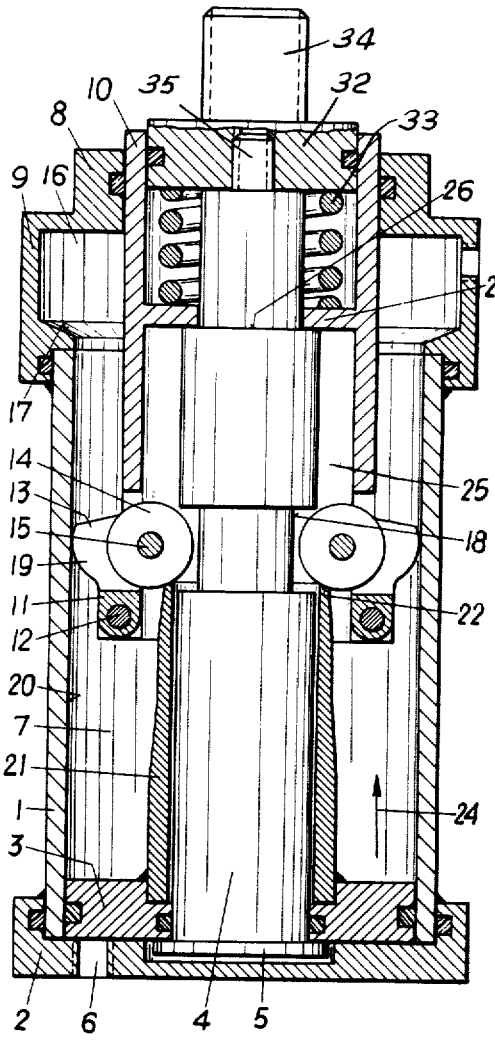
FIGS. 1 and 2 illustrate partly in elevation and partly in cross section one embodiment of the work-locating device in the starting position and the tension position, respectively.
Figure 2:
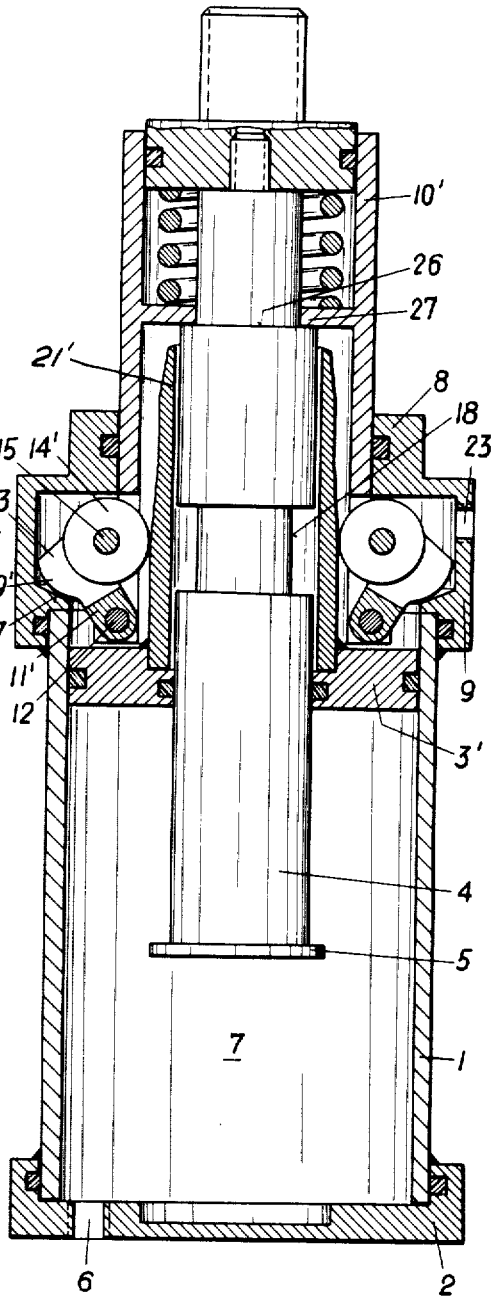
Figure 3:
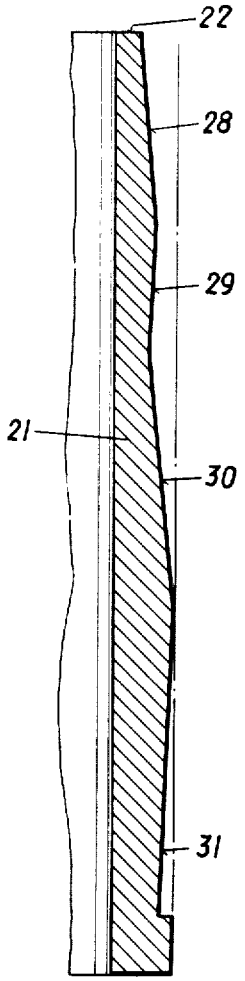
FIG. 3 is a fragmentary view on an enlarged scale of the collet according to FIGS. 1 and 2 and FIGS. 4 and 5.

In the embodiment according to FIGS. 1 to 3, a pneumatic cylinder 1 is closed by a bottom piece 2, fixedly attached to the cylinder 1. In the cylinder 1 is tightly guided an annular piston 3 which constitutes an actuating piston of the pneumatic system, and a central piston 4 is tightly guided in the annular piston 3. A collar or flange 5 of the piston 4 coacts with the outer surface of the piston 3 to limit the movement of the piston 4 opposite the piston 3. A pressure connecting means 6 is provided in the bottom piece 2 for supplying pressurized air to a working area or space 7 for the piston 3 or piston 4. A collar 8 is located at the end of the cylinder 1 remote from the bottom piece 2, with the collar being formed by a circular part 9 fixedly connected with the cylinder. A circular space 16 is formed in the part 9, and the part 9 is delimited at its side facing the piston 3 by an area 17 of a flat conical shape positioned transversely to the axis of the cylinder 1. A pressure-connecting means 23 is associated with the circular part 9 and communicates with the space 16.

A cylindrical tension part 10 is tightly positioned in the collar 8 and a portion thereof extends into the cylinder 1. The piston 4 has a shoulder 26 with which it is supported towards an inwardly extending flange 27 of the part 10. A plurality of swinging levers 11 are mounted on axles 12 of the cylindrical part 10 and are evenly positioned around the circumference of the central piston 4. The levers 11 are of a forked shape and guide-rollers 14 are rotatably positioned on axles 15 provided between fork-arms 13 of the levers. The piston 4 is provided with an annular groove 18 in which the guide rollers 14 are located while the starting stroke is at an idle position (FIG. 1). A nose 19 of the levers 11, which constitutes a sensor or feeler abuts or engages inner wall 20 of the cylinder 1, and holds the guide-rollers 14 in their position in the annular groove 18. A collet or sleeve 21 is fixedly connected to the piston 3, encircling loosely the central piston 4, and a front area or edge 22 thereby coacts with the guide rollers 14.

When the space 7 is placed under pressure via the pressure connection 6, the piston 3 and piston 4 move into the direction of the stroke indicated by arrow 24. The front edge 22 of the collet 21 thus pushes against the guide-rollers 14 and levers 11 try to swing outwardly about the axles 12 into the stroke direction 24, but such a movement is limited since the noses 19 engage the wall 20 of the cylinder 1. As soon as the noses 19 enter the area of the recess 16, the noses move or dip so to speak into the recess 16. This is effected as the front edge 22 of the collet 21 engages eccentrically at the guide rollers 14, thereby resulting in a force component towards the outside. The levers 11, together with the guide rollers 14 and the noses 19, reach the positions 11', 14', 19' in FIG. 2. The guide rollers 14 roll on the periphery of the collet 21 and leave the annular groove 18 and hence the piston 4. The starter stroke ends in this position.

The collet 21 enters into an annular space 25 between the piston 4 and the part 10, whereby the annular piston 3 continuously moves further into the direction 24. The piston 4 moves into the direction 24 only until it meets resistance. Since the starting stroke is measured so that at the end of such stroke the working stroke begins, the piston 4 will only very slowly continue its stroke, when the levers 11 together with the noses 19 enter the recess 16.

The mechanical step-up mechanism is defined by the collet 21, the levers 11 together with the feelers 19 and the guide rollers 14. The further the annular piston is lifted, the further movement of the collet 21 in the annular space 25 and the further the guide rollers 14 and the levers 11 are pushed outwardly, so that the guide rollers 14 now function as pressure means which support themselves on the area of flat conical shape 17. The tension part 10 is thereby displaced with great force by a small distance into the direction 24, as shown in FIG. 2.

The collet 21 is illustrated on a larger scale in FIG. 3. At the free end, adjacent the front edge 22, the periphery has an outwardly inclined guide area or section 28 for the guide rollers 14, which, merges with a cylindrical guide area 29. The guide area 29 merges with a further outwardly inclined guide area 30, while an inwardly inclined guide area 31 merges with the guide area 30. Instead of the cylindrical guide area 29, there may be provided also a guide area which is inwardly inclined and in place of the inwardly inclined guide guide area 31 there may be a cylindrical guide area.

As long as the guide rollers 14 move on the outwardly inclined guide areas 28 and 30, the levers are pushed outwardly and this is in accordance with the working stroke. If the guide rollers move on the cylindrical or inwardly inclined guide areas, no working stroke is then performed and in this area a resetting or loosening can thus not be effected even with the highest pressure on the tension part 10 opposite the direction 24, eventhough the working space 7 is relieved of pressure. At the end of the working stroke, the guide rollers contact the area 31. Due to this self-locking, the annular piston 3 remains in its position 3', in which the levers 11 together with the feelers 19, are pressed into the circular area 16 and because of pressure relief in the working space 7, a resetting of the tension part 10, from the working area 10' cannot be effected. In order to effect the resetting, the circular area 16 is pressurized via the connecting means 23. The annular piston 3 is moved in a direction opposite to the stroke direction 24, the collet 21 which is in the position 21' is drawn from the annular area 25, and the tension device moves back into the starting position, shown in FIG. 1.

As illustrated, a piston-shaped insertable member 32 is guided in the tension part 10 to be axially movable, and is biased by a spring 33 towards the flange 27 of the tension member 10. The member 32 carries a threaded connection member 34 to which may be connected any type of adapter piece for the purpose of correctly setting the starter stroke.

The member 32 may be threaded into the central piston 4 by means of a thread 35, so that it is securely guided over a comparatively large distance. The spring 33 effects on one hand, the avoiding of an overload of the tension device and on the other hand, it permits the precise setting of the tensional force by the spring 33. Since, at the end of the working stroke, the spring 33 is compressed, the tension force will not substantially decrease, when at a pressure loss, the guide rollers 14 abut an outwardly inclined area 30 of the collet 21 and force the collet 21 together with the piston 3 until they are moved onto a cylindrical or inwardly inclined area.

Figure 4:
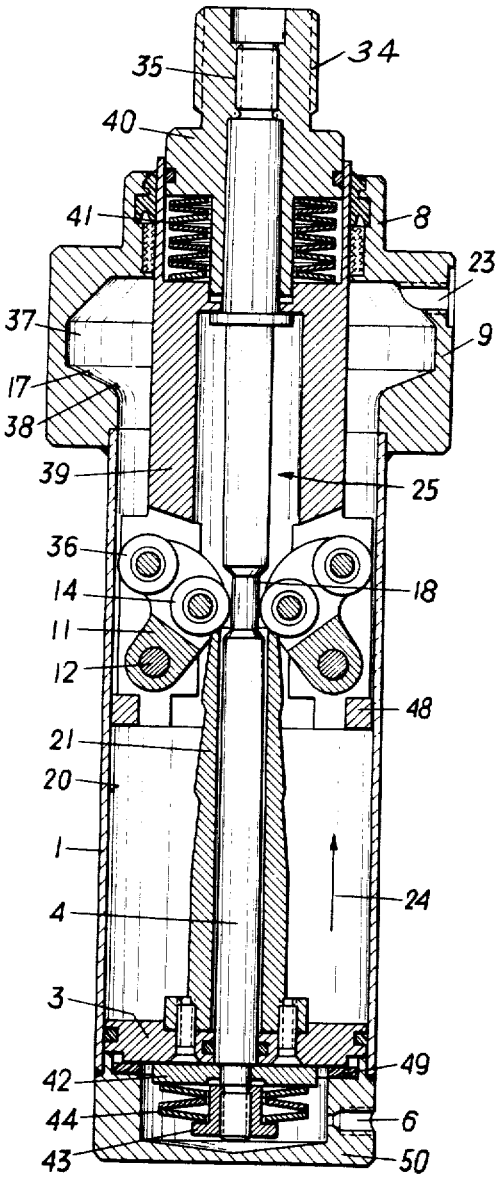
FIGS. 4 and 5 are views similar to FIGS. 1 and 2 of another embodiment of the work locating apparatus in its starting position and the tension position, respectively.
Figure 5:
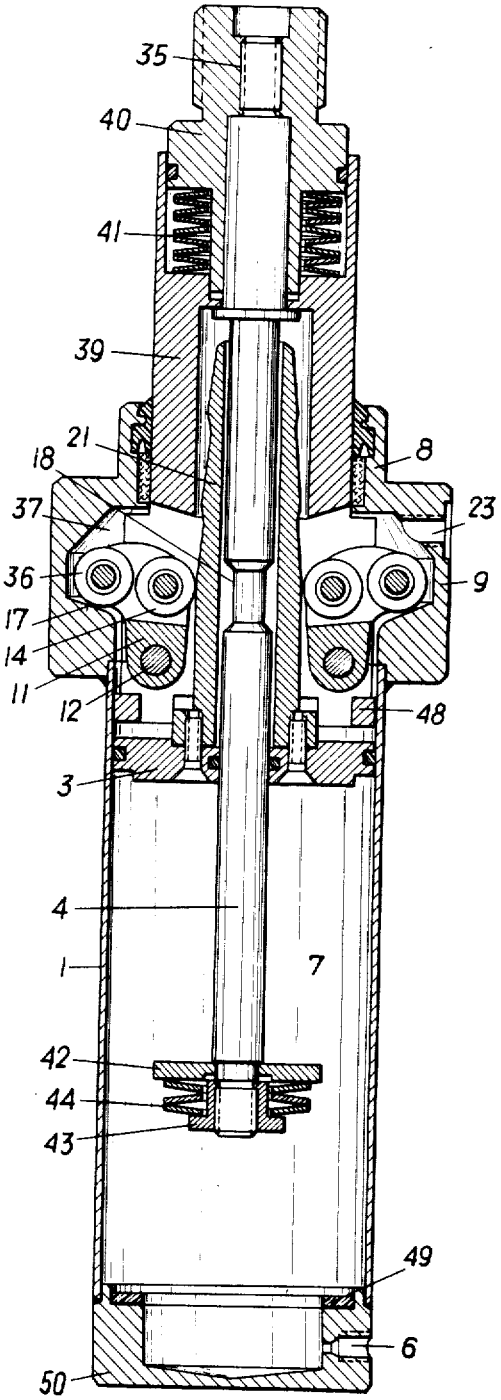

In the embodiments shown in FIGS. 4, and 5, a second roller 36 is carried by the lever 11, with the roller 36 defining a sensor or feeler 19. The rollers 36 are rolling off the inner wall 20 of cylinder 1, until they enter a circular space or area 37 which is somewhat differently shaped, but has in principle the same function as the circular area 16 in FIGS. 1 and 2. The area 17 of flat conical shape merges into the cylinder via a rounding 38. The rollers 14 move again in the same manner as in FIGS. 1 and 2 at the end of the starting stroke onto the collet 21. The levers 11 are again urged outwardly and the rollers 36 roll onto the area 17, whereby tension part 39 is moved by a strong force and a small distance in the direction 24.

In this embodiment, an insertable member 40, which in general is similar to the member 32 of FIGS. 1 and 2, is threaded together with the central piston 4 at 35 and is axially movably guided in the tension member 39. The supporting of the member 40 against the tension part 39 is, in this embodiment, effected by means of cup springs 41 which has the same function as the springs 33 in FIGS. 1 and 2.

At the lower part of the central piston 4 is located a collar 42 similar to the collar 5 but the collar 42 is not mounted immediately adjacent the central piston, but is attached thereto by means of a bolt nut 43 via cup springs 44. A ring 49 of an elastic material is inserted into bottom piece 50 of the cylinder 1 for the purpose of mounting the annular piston 3.

In this embodiment, the tension member is supported against the cylinder near the pivotal points of the levers 11. The supporting is constituted by a circular collar or flange 48 by which the tension member 39 is guided in the cylinder.

In general, the function of the apparatus according to FIGS. 4 and 5 is the same as that of FIGS. 1 and 2, and identical parts thereof are identified by the same numerals.

Figure 6:
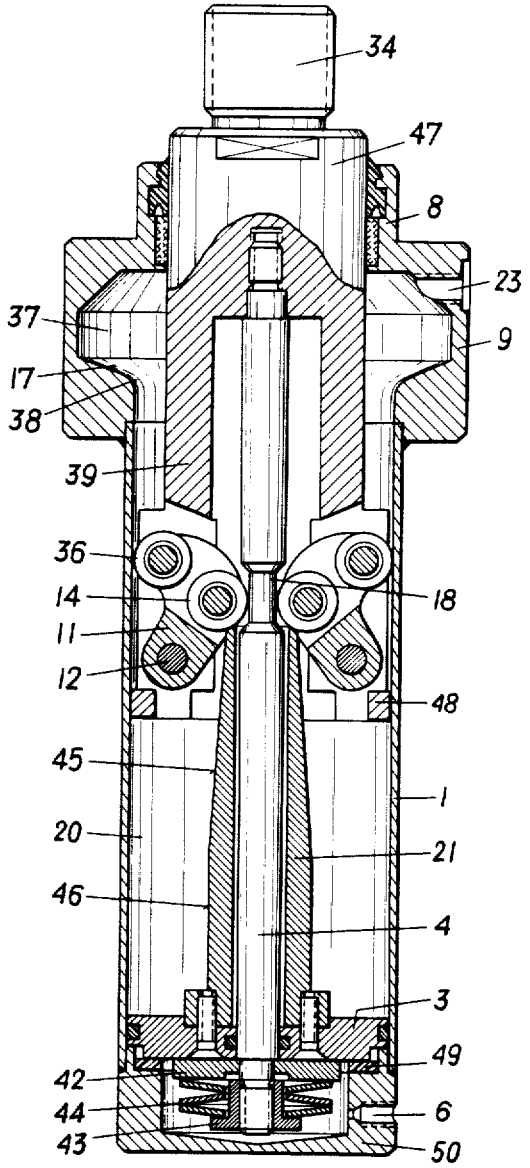
FIG. 6 illustrates an altered embodiment partly in elevation and partly in cross section, of the work locating device in its starting position.

The embodiment of FIG. 6 differs from FIGS. 4 and 5 and also from FIGS. 1, 2 and 3 in that the collet 21 is provided with a uniform outwardly inclined area 45 which changes into a cylindrical area 46. Furthermore, a tension part 47, which, in its function, is the same as the tension part 39 or 10, and which again is threaded together with the central piston 4, is connected immediately and without the insertion of an insertable member 40 or 32 with the threaded connection member 34.

As shown by the drawings, the device of the present invention permits the performing of a working stroke after completion of a starting stroke, thereby enabling a very high application of power at a short tension-distance. If, for example, pressurized air with a pressure of 6 over atmospheric pressure is available, it is then possible that a starting power of 200 kp may be utilized whereby a power of approximately 3,000 kp is obtained during the working stroke.

What is claimed is:

1. A work locating apparatus having a tension member actuated by means of a piston movable within a cylinder, particularly a pneumatic cylinder, via a starting stroke and a working stroke, in which said tension member is actuated with an amplified force by a mechanical step-up mechanism during the working stroke whereby said piston becomes releasable from said tension member and said piston actuates on the one hand, said tension member directly via said starting stroke and on the other hand, said step-up mechanism via said working stroke, the improvement comprising swinging levers hinged on said tension member, each lever being provided with an abutment portion and a guide portion, said abutment portion being guided along the cylinder wall during the starting stroke, a collet coaxial with said cylinder, said piston being connected to said collet, said collet having wedge-shaped outer surfaces which cooperate with said guide portion of said swinging levers, and said cylinder being provided with an abutment surface positioned transversely to the axis of the cylinder with said abutment portions of said swinging levers being pressed against said abutment surface during the working stroke.

2. The work locating apparatus as claimed in claim 1 in which the piston is defined by an annular piston, a central piston encircled by the annular piston, whereby said central piston is connected with the tension member, and said collet encircling the center piston.

3. The work locating apparatus as claimed in claim 2 in which the central piston is provided with a recess into which the guide portion of the lever, which lever is located at a distance from the rotation axis, may evasively move as long as that part of the lever defining the abutment portion contacts the inside wall of the cylinder, whereby the front edge of the collet engages the guide portion during the starting stroke and the cylinder being provided with an enlarged area, which is delimited axially at the side nearest to the annular piston by means of the abutment surface, and the abutment portion of the lever at the completion of the starting stroke enters the enlarged area, whereby the guide portion of the lever is moved to the wedge-shaped outer surface of the collet.

4. The work locating apparatus as claimed in claim 3 in which the front edge of the collet engages a contact area of the guide portion, said guide portion being tilted radially outwardly at the end of the starting stroke.

5. The work locating apparatus as claimed in claim 1, in which said wedge-shaped outer surfaces of said collet constitute a conical surface.

6. The work locating apparatus as claimed in claim 1, including a pressure means which transmits the tension power and in which the pressure means is provided with a connector thread for receiving a selectively attachable connection member.

7. The work locating apparatus as claimed in claim 1 in which the part of the lever defining the abutment portion is formed according to a sliding curve.

8. The work locating apparatus as claimed in claim 1 in which a pressure means which transmits the tension power, is supported against the tension member by means of interpolation of a spring means.

9. The work locating apparatus as claimed in claim 8 in which the pressure means is fixedly connected with the central piston.

10. The work locating apparatus as claimed in claim 8 in which the pressure means is carried in the tension member via a piston.

11. The work locating apparatus as claimed in claim 3 in which the abutment surface is arranged at a sloping angle to the stroke direction in the axial direction of the cylinder whereby said abutment surface is of a flat conical shape.

12. The work locating apparatus as claimed in claim 11 in which the abutment surface merges with a rounded intermediate section into the inside area of the cylinder.

13. The work locating apparatus as claimed in claim 1 in which the part of the lever defining the abutment portion is provided by a roller positioned in the lever.

14. The work locating apparatus as claimed in claim 3 in which the tension member is of cylindrical shape, and the enlarged area being located in a first collar, said enlarged area being circular and being provided with a connecting means for a pressure supply.

15. The work locating apparatus as claimed in claim 3 in which the enlarged area of the cylinder is defined as a circular space and the recess of the central piston is defined as an annular tee-slot and a plurality of swinging levers being evenly distributed about the circumference of the central piston and being positioned in the tension member.

16. The work locating apparatus as claimed in claim 15 in which the tension member is supported near the pivotal points of the levers against the cylinder, with the tension member being provided with a third collar which is circular, said tension member being guided in the cylinder by said third collar.

17. The work locating apparatus as claimed in claim 3, in which the guide portion is defined by a roller positioned in the lever.

18. The work locating apparatus as claimed in claim 2 in which the central piston is provided with a second collar which is placed on the central piston.

19. The work locating apparatus as claimed in claim 18 in which the second collar is spring biased towards the annular piston.

20. The work locating apparatus as claimed in claim 3 in which the tension member encircles the central piston to provide an annular recess which enables the insertion of the collet.

21. The work locating apparatus as claimed in claim 2 in which the collet is provided with an outwardly inclined section merging with a cylindrical section, the cylindrical section merging with a second outwardly inclined section and an inwardly inclined section merging with said second outwardly inclined section.

22. The work locating apparatus as claimed in claim 2 in which the bottom of the cylinder is provided with a ring of a plastic material, providing an elastic mounting for the annular piston.

* * * * *

UNITED STATES PATENT AND TRADEMARK OFFICE

CERTIFICATE OF CORRECTION

PATENT NO. : Re. 28,967

DATED : September 21, 1976

INVENTOR(S) : Dieter Weiss

It is certified that error appears in the above-identified patent and that said Letters Patent are hereby corrected as shown below:

[30] Foreign Priority Data:

Germany 2121042 filed April 29, 1971

Signed and Sealed this

Eighth Day of March 1977

[SEAL]

*Attest:*

RUTH C. MASON
*Attesting Officer*

C. MARSHALL DANN
*Commissioner of Patents and Trademarks*